United States Patent Office

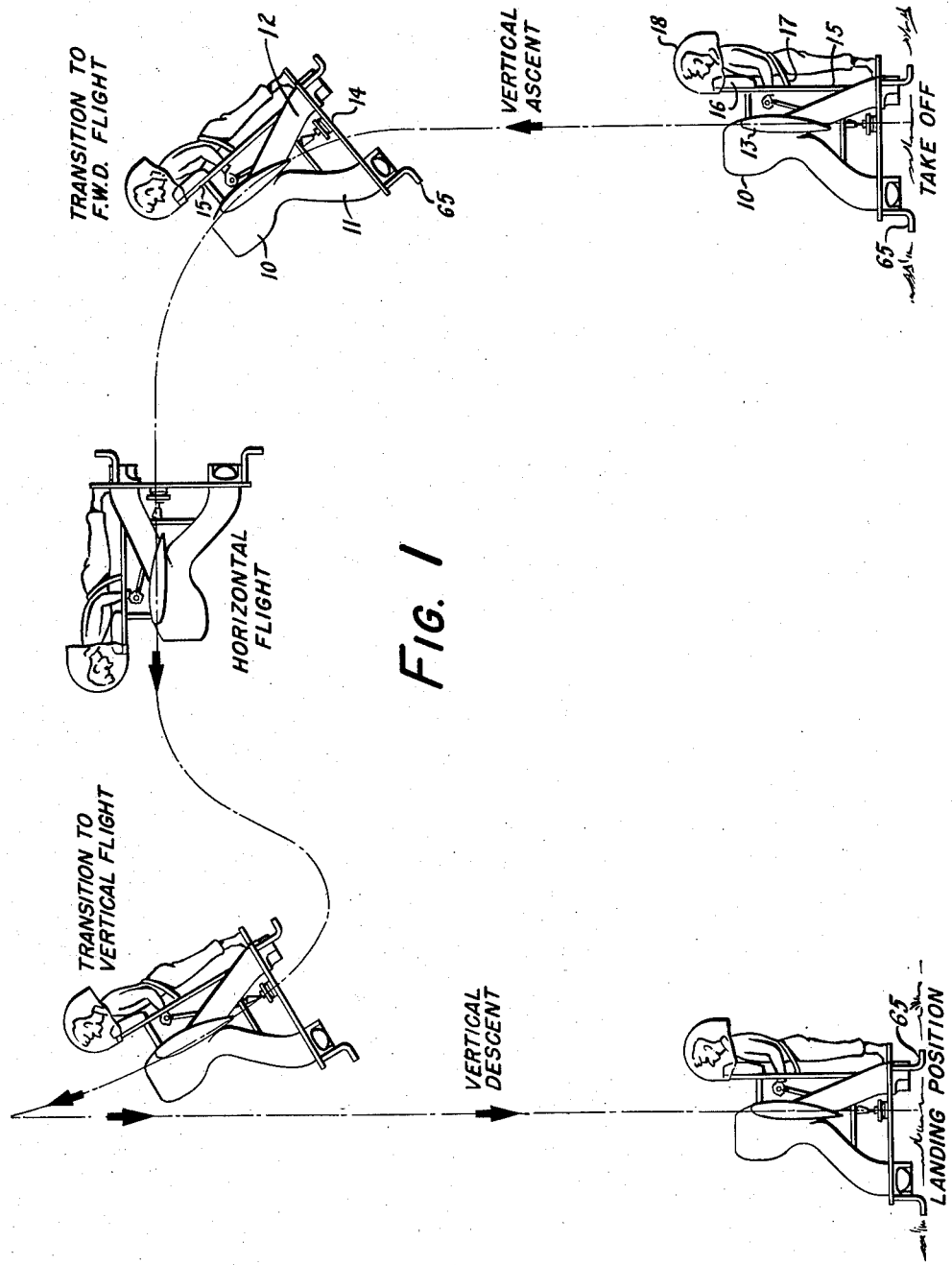

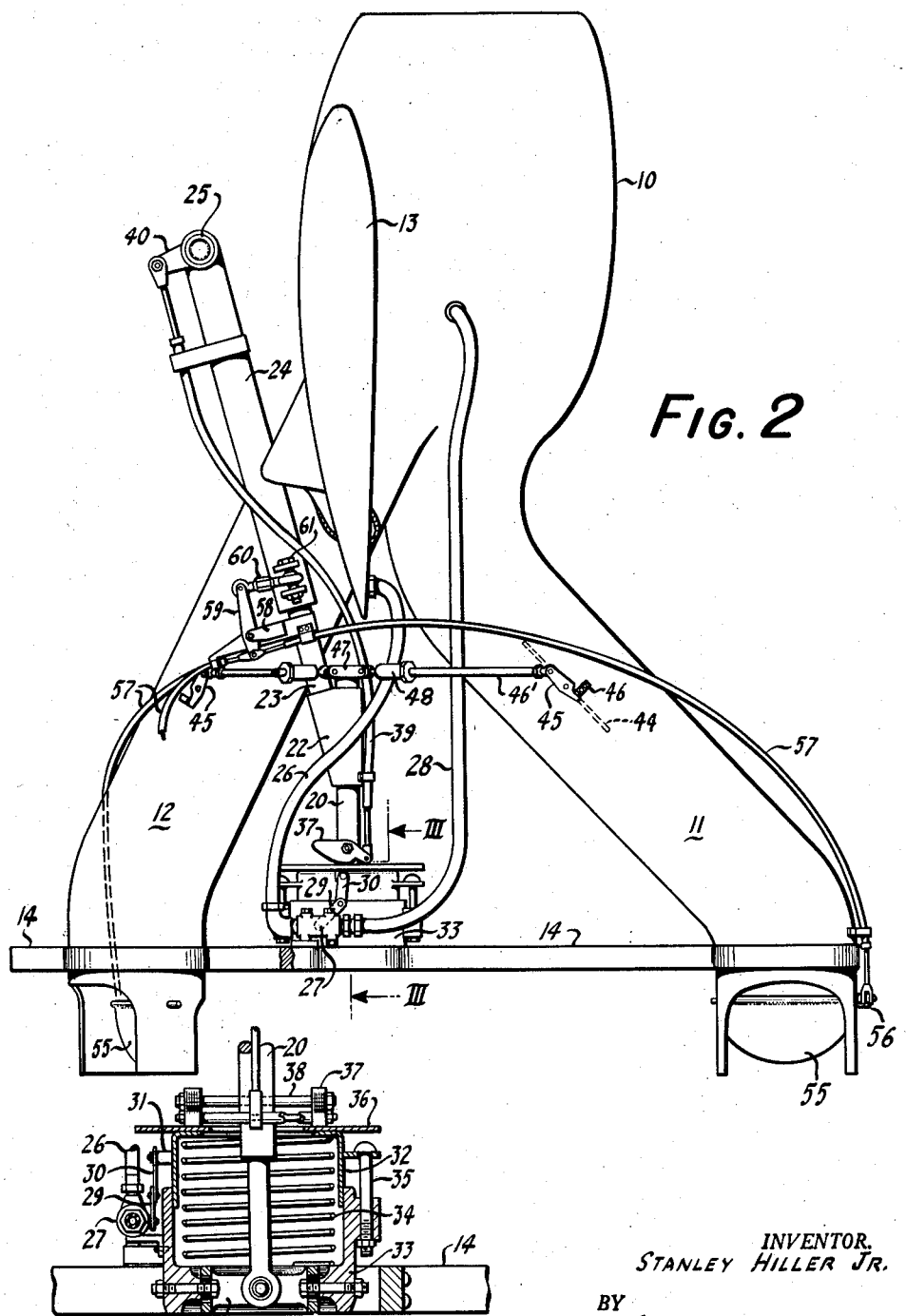

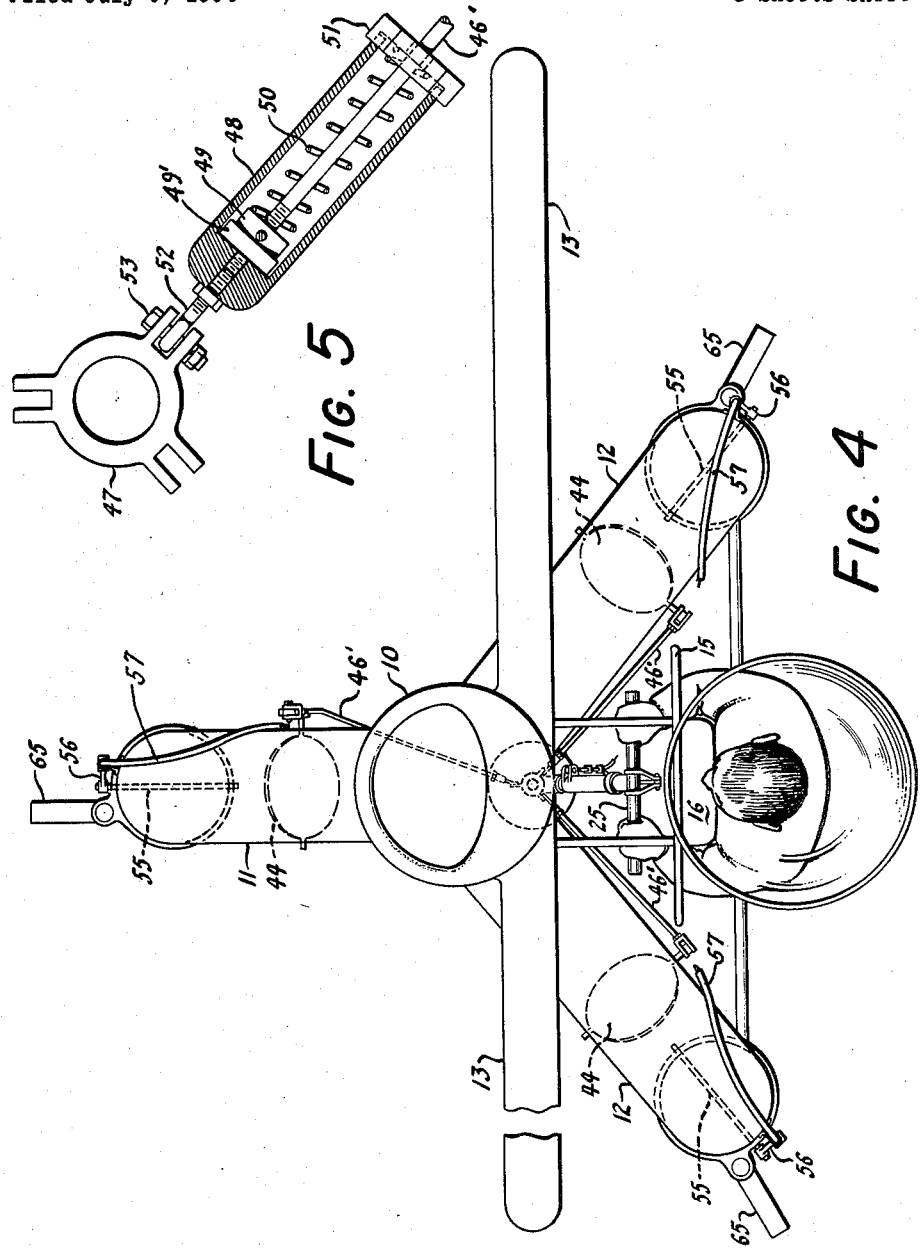

2,943,816

VERTICAL TAKE-OFF HIGH-SPEED AIRCRAFT

Stanley Hiller, Jr., Atherton, Calif., assignor to Hiller Aircraft Corporation, Palo Alto, Calif., a corporation of California Filed July 6, 1954, Ser. No. 441,353

14 Claims. (Cl. 244—23)

This invention relates to high-speed aircraft capable of vertical take-off and landing operations.

It is an object of the invention to provide an aircraft powered by a turbine or pulse jet system, or the like, with a plurality of tail or thrust pipes leading from the engine to suitably spaced points to serve also as landing gear for the ship and which is provided with means to control the relative thrust from the engine through the individual thrust pipes to establish and control flight direction. A further object of the invention is the provision in such an aircraft of means to vary the direction of exhaust or thrust from the tail pipes to counteract any tendency of the craft to yaw or spin in flight. Another object of the invention is to provide such a craft of simple construction and with a single control member operable by a pilot to obtain desired quantity and direction controls over the gases passing through the individual tail pipes and also to provide control of fuel feed to the engine.

The invention will best be understood by reading the following description with reference to the accompanying drawings, wherein a small or single occupant craft embodying the principles of the present invention is described and illustrated.

In the drawings:

Fig. 1 is a schematic view illustrating an aircraft embodying the present invention as it would appear in several positions during transition from a take-off position through normal flight, and return to a landing position;

Fig. 2 is a view of the same aircraft in side elevation with some parts omitted, and some parts broken away to disclose portions of operating mechanism;

Fig. 3 is an enlarged section of a portion of the operating mechanism taken on line III—III of Fig. 2;

Fig. 4 is a plan view of the same craft with the pilot in position thereon; and

Fig. 5 is an enlarged detail in section of a portion of the control mechanism.

Referring first to Figs. 1, 2 and 4, an aircraft constructed in accordance with the present invention is illustrated as having an engine housing 10 designed to contain a turbine or pulse jet engine (not shown), and extending in an upright direction in the ground position of the ship. The engine may be of any suitable conventional type which causes forward motion of a craft by the thrust reaction of gases passing through a tail pipe, and the details of construction of the engine are not essential to an understanding of the present invention. In accordance with the present invention, the engine housing 10 is provided at its lower end with three jet thrust or tail pipes extending in an upright direction, and which receive substantially equal proportions of gases discharged during the operation of the engine. These three pipes are substantially equally spaced apart in triangular formation to provide a forward pipe 11 and two rearwardly extending pipes 12. The centers of the outlets of these pipes are preferably equi-distant from the center of gravity of the craft. The engine housing and the thrust pipes are interconnected and cooperate to provide the main body frame of the aircraft upon which the remaining aircraft structure is mounted. That is, the body frame of the aircraft consists essentially of two main portions, the engine housing and the thrust pipes which provide the landing gear for the aircraft.

A pair of stub wings or air foils, shown at 13, project outwardly from opposite sides of the engine housing to facilitate stable flight. A pilot's platform shown at 14 forms a connection between and serves as a brace for the three thrust pipes. The pilot stands upon the platform 14 in the position shown in Fig. 1 where he is directly behind a vertical panel 15 which has a chest or torso pad 16 thereon, and is also provided with a belt 17 to encircle the pilot's waist. A hood or head protector 18 is also preferably supported at the upper end of the panel 15 and may be made of any durable transparent material.

With a pilot's station constructed in this manner, the pilot occupies a standing position during vertical ascent and a forward reclining position during horizontal flight with both hands always free to manipulate a flight control column, the construction and operation of which will presently be described in detail. The pilot controls three essential elements of flight of the craft which are thrust or speed, direction, and spin control or stability. All of these elements of flight are controllable through a single control column with a crossbar at its upper end which is grasped in the pilot's hands.

Thrust is controlled by the rate of fuel flow to the engine through a throttle valve. Direction is controlled by dampers in the thrust pipes adapted to close or to partially close any of the pipes to increase the relative thrust from the others, and therefore vary the direction of flight. Spin or yaw, which is the tendency of a craft to rotate about an axis parallel to its direction of flight, is controlled by flaps adjacent the ends of the thrust pipes which act somewhat in the manner of flaps or ailerons on ordinary airfoils to vary the direction of thrust reaction and thereby stabilize the craft in flight or overcome its tendency to spin.

The structure of the single control column and its connections with the several controlled elements are subject to variation in design, but one practical form of this mechanism is illustrated in the drawings. Referring now to Fig. 2, the control column is shown as comprising a short vertical post 20, the lower end of which is supported for universal movement with respect to the pilot's platform 14. A simple universal joint for providing this connection is illustrated in Fig. 3 at 21. Adjacent its upper end the post 20 has a Y-shaped fitting 22 supporting a rearwardly inclined post 23 upon which is rotatably mounted a control member 24. The upper end of the control member 24 carries a crossbar or handgrip 25 (see also Fig. 4) mounted on a suitable bearing for rocking motion about its own horizontal axis.

The supply of fuel to the engine is controlled by the handgrip 25, and, as shown in Fig. 2, fuel from a tank (not shown) in the stub wings 13 flows through a line 26 to a throttle valve 27, and thence through a line 28 to the engine in housing 10. Throttle valve 27 may be opened or closed by manipulation of a lever 29 disposed at its side; and this lever is pivotally connected to a link 30 connected to a pin 31 (see Fig. 3) secured to a cylindrical member 32 telescopically mounted in a cylindrical base 33 suitably secured to pilot's platform 14. A spring 34 normally urges the cylindrical member 32 upwardly to effect closing of the throttle valve through link 30 and lever 29. Stop members in the form of bolts, one of which is shown at 35 in Fig. 3, limit the upward or closing movement of member 32.

A cam plate 36 is secured to the top of the member 32 and may be depressed by a pair of pivoted cams 37 journalled on a cross member 38. A Bowden cable 39 or other suitable motion-transmitting mechanism, forms a connection between cams 37 and a lever 40 fixed to and projecting from the handgrip 25. Thus, upon rotation of the handgrip 25 in a direction forwardly or away from the pilot, cams 37 will be rocked to depress the element 32 and open the throttle valve in the manner described. The flow of fuel to the engine will preferably be under pressure from suitable pumping mechanism (not illustrated).

Mechanism for controlling direction of flight is illustrated in Figs. 2, 4 and 5, and comprises valves or dampers 44. One such damper is disposed in the forward thrust pipe 11 and in each of the two rearward thrust pipes 12. Each damper is pivotally mounted in its thrust pipe, and is capable of rocking movement about its pivotal support from a normal fully opened position illustrated in Fig. 2 to a position at right angles thereto where it will close the pipe to prevent the flow of gases therethrough. Since the three thrust pipes are equally spaced about the center of gravity of the craft, selective manipulation of the dampers 44 is employed to obtain directional control. For example, by reference to Fig. 1, a craft in vertical ascent will undergo transition to forward flight upon closing, or partially closing, the damper in the forward thrust pipe 11. Then, when the craft is in forward or horizontal flight, transition to vertical flight will be accomplished by closing, or partially closing, the dampers in the rearward thrust pipes 12. In the same manner, direction of flight in a horizontal plane may be varied by manipulation of either one or the other of the dampers in the rearward thrust pipes 12. All three of the dampers 44 are connected with the control column by the mechanism shown in Figs. 2, 4 and 5.

Referring first to Fig. 2, each damper is shown as having a lever 45 fixed to its pivotal support, and engaging a stop lug 46 which limits the rocking movement of the damper in one direction to a full open position. Rocking of the lever 45 in the opposite direction tends to close the damper. To accomplish this closing movement, each lever 45 is pivotally connected to a rod assembly including a rod 46' and which is also pivotally connected to a collar 47 secured to the upper end of the universally mounted post 20 of the control column. Each of rods 46' is spring pressed by a resilient assembly, shown in Fig. 5, comprising a spring housing 48, into which the rod projects. The end of the rod in the spring housing carries a spring seat 49 slidable in the housing and adapted to abut against fixed seat 49' in the housing; a spring 50 being interposed between seat 49 and an end closure member 51 of the housing through which rod 46' is slidably mounted. The housing is itself directly connected to collar 47, as by an eye bolt 52 and pin bolt 53.

Spring 50 is under compression and normally thrusts rod 46' inwardly to hold the damper open against stop 46. When the control column is swung about its universal support in the direction of any one damper, an outward thrust is imposed upon the connecting rod 46' connected to such damper to swing the damper towards its closed position. However, due to the resilient assemblies 48, the other two dampers remain fully open as the rods 46' connected to such dampers are effectively lengthened by compression of their associated springs 50. With the triangular arrangement shown, the control column when pulled rearwardly or toward the pilot will tend to close both of the dampers in the thrust pipes 12. Similarly, direct forward motion of the control column closes the damper in the thrust pipe 11. It is also possible to impart closing movement to the forward damper and one rear damper by a forward oblique motion of the control column.

To stabilize flight or prevent that phenomenon known as rolling or yawing, each of the three tail pipes is provided adjacent its end with a flap 55 normally disposed in a plane parallel to the flow of gas through the pipe. Swinging of these flaps to either side causes impingement of the gases on that side with a resulting thrust reaction toward the opposite side to counteract any tendency of the craft to roll or yaw. Each flap 55 is pivotally mounted, and has a lever 56 fixed to its pivotal support and connected as by a Bowden cable 57 or similar motion transmitting mechanism with the control column. The connection of these cables with the control column is shown in Fig. 2 as comprising a bracket 58 fixed to and extending from the non-rotatable part 23 of the column. A lever 59 is pivotally mounted at the outer end of this bracket and all of the cables 57 are connected with the lower end of this lever.

A connecting rod 60 extends between the upper end of the lever 59 and a pin 61 supported in suitable brackets on one side of the rotatable part 24 of the control column; rod 60 being universally connected to lever 59 and pin 61. With this construction, rotation or twisting movement of the part 24 about its own axis serves to rock the lever 59 in either direction. When the lever is rocked clockwise, as viewed in Fig. 2, a thrust will be imposed on the rear cables 57 to swing the flaps 55 in one direction and tension is imposed on the forward cable 57 to swing the forward flap 55 in the same direction by virtue of the fact that the lever 56 on this flap is, as shown in Fig. 4, arranged in the opposite direction looking outwardly from the vertical center line of the craft, with respect to the pivotal support of the flap. Consequently, by twisting the control element 24 in opposite directions, all of the flaps 55 move together in either one direction or the other to create a thrust reaction for opposing the tendency of the craft to roll about its own flight axis.

Supports or foot members shown at 65 (Figs. 1 and 4) may be fixed to the lower or outer ends of the thrust pipes 11 and 12 to support them in a position slightly above the ground.

Fig. 1 of the drawings graphically depicts the manner of operation of the craft as it progresses through vertical ascent, horizontal flight and vertical descent. The speed of vertical descent will of course be controlled by manipulation of the throttle to the position where the action of the gases emanating from the thrust or tail pipes nearly offsets the force of gravity upon the craft whereby the descent will be at moderate speed and landing on these pipes which serve as the landing gear of the ship, will take place without excessive shock.

I claim:

1. A jet propelled aircraft comprising an immovable housing for a jet-type engine, three thrust pipes leading from the housing to spaced exhaust points, dampers in the thrust pipes for varying the flow quantity of gases therethrough to control flight direction, an adjustable flap movably mounted adjacent the end of each thrust pipe to insure stable flight, means to control flow of fuel to the engine, a pilot supporting platform positioned between a pair of adjacent pipes and secured thereto, a movable control column manually operable by a pilot supported on said platform, and connections between the control column and the dampers, flaps and fuel control means to enable adjustment thereof.

2. A jet propelled aircraft capable of vertical take off and landing comprising a main body frame consisting essentially of a jet engine housing and a plurality of individual thrust pipes each of which is immovably connected at one end to said housing and which terminates at its other end at a point spaced from said housing, said other ends of said pipes being cooperable to provide a support for the aircraft when the same is at rest on the ground, said pipes communicating with said housing whereby thrust reaction of gases produced in a jet engine in said housing produces propulsion of the aircraft, an airfoil extending from and being immovably connected to opposite sides of said housing for stabilizing flight of the aircraft, valve means in each of said pipes to vary the flow of gases therefrom for effecting directional control of the aircraft in flight, and pilot operable means for selectively controlling said valve means.

3. The aircraft according to claim 2 with the addition of means adjacent said lower ends of said pipes for deflecting gases flowing therefrom to effect spin control of said aircraft in flight.

4. A jet propelled aircraft capable of vertical take off and landing comprising an engine housing, three hollow exhaust pipes fixedly connected to said housing and extending therefrom and immovable relative thereto, the ends of said pipes which are remote from said housing being spaced apart and arranged in substantially triangular formation to provide stable support for said aircraft on the ground, a jet-type engine mounted in said housing to discharge thrust gases substantially equally into each of said pipes, movable valve means mounted in each of said pipes to selectively control the quantity of flow of gases through the respective pipes to control the direction of flight of said aircraft, movable flap means adjacent the spaced apart ends of said pipes for changing the direction of flow of gases from said pipes to control stability of the aircraft in flight, means to control the amount of thrust produced by said engine, and manually operable control means for regulating said valve means, said flap means and said thrust control means during flight of said aircraft.

5. A jet propelled aircraft comprising a main body frame consisting essentially of two portions upon which the remaining aircraft structure is mounted, said portions being a jet engine housing and a plurality of thrust pipes fixedly and immovably connected to and depending from said housing, each of said thrust pipes providing support for the aircraft on the ground whereby said aircraft is supported by all of said pipes when not in flight, a jet engine mounted in said housing for effecting flow of thrust gases individually through said pipes to effect propulsion of said aircraft, an airfoil wing extending from each of opposite sides of said housing and fixedly and immovably mounted relative to both said housing and said pipes, valve means in each of said pipes to vary the flow of gases therefrom for directional control of said aircraft in flight, and flap means adjacent the lower end of each of said pipes for effecting yaw control of said aircraft in flight.

6. A jet propelled aircraft comprising a main body frame consisting essentially of two portions upon which the remaining aircraft structure is mounted, said portions being a jet engine housing and a plurality of thrust pipes fixedly and immovably connected to and depending from said housing, each of said thrust pipes providing support for the aircraft on the ground whereby said aircraft is supported by all of said pipes when not in flight, a jet engine mounted in said housing for effecting flow of thrust gases individually through said pipes to effect propulsion of said aircraft, an airfoil wing extending from each of opposite sides of said housing and fixedly and immovably mounted relative to both said housing and said pipes, valve means in each of said pipes to vary the flow of gases therefrom for directional control of said aircraft in flight, flap means adjacent the lower end of each of said pipes for effecting yaw control of said aircraft in flight, and a pilot supporting station rigidly connected to each of said thrust pipes and bracing the same.

7. In an aircraft of the type propelled solely by jet thrust gases, a jet engine housing, three thrust pipes communicating with said engine housing and extending therefrom with the ends of said pipes remote from said engine housing terminating at substantially equally spaced apart points, said thrust pipes depending from said engine housing and extending substantially in an upright direction when said aircraft is on the ground, said pipe ends providing support for the aircraft on the ground, said engine housing being immovable relative to said thrust pipes, valve means mounted in each of said pipes to control flow of gases through said pipes to control directional flight of the aircraft, and means including a universally mounted pilot operable control member for controlling selectively said valve means.

8. In a jet propelled aircraft, a jet engine housing, a plurality of individual thrust pipes communicating with said housing and terminating in spaced apart ends remote from said housing, said housing and said thrust pipes being immovable relative to each other, means mounted in each of said pipes to control the flow quantity of gases selectively through said pipes to control the direction of flight of the aircraft, and means adjacent said pipe ends to deflect the gases flowing therethrough for controlling stability of the aircraft in flight.

9. In a jet propelled aircraft, a jet engine housing, a plurality of individual thrust pipes communicating with said housing and terminating in spaced apart ends remote from said housing, said housing and said thrust pipes being immovable relative to each other, means mounted in each of said pipes to control the flow quantity of gases selectively through said pipes to control the direction of flight of the aircraft, means to deflect the gases adjacent said ends of said pipes for controlling stability of the aircraft in flight, and a single control column operable manually by the aircraft pilot to adjust the positions of the flow control means and the deflecting means.

10. In a jet propelled aircraft, a jet engine housing, a plurality of individual thrust pipes communicating with said housing and terminating in spaced apart ends spaced from said housing, said housing and said thrust pipes being immovable relative to each other, means mounted in each of said pipes to control the flow of gases selectively through said pipes to control the direction of flight of the aircraft, means to deflect the gases adjacent said ends of said pipes for controlling stability of the aircraft in flight, a single control column manually operable by the aircraft pilot to adjust selectively the positions of the flow control means and the deflecting means, means to supply fuel to an engine in said housing including a fuel regulating valve, and control means for said fuel valve on said control column.

11. A jet propelled aircraft comprising an immovable housing for a jet-type engine, at least three thrust pipes communicating with said housing and terminating in pipe ends spaced from said housing, said pipes depending from said housing and extending substantially in an upright direction when the aircraft is on the ground, said pipe ends providing support for the aircraft on the ground, a pilot supporting station and a pilot operable control column in the area between said housing and said pipe ends, a movable valve mounted in each pipe for varying the flow quantity of gases therethrough for effecting directional control of the aircraft in flight, and means operatively connecting each of said valves to said control column whereby independent adjustment of said valves may be effected.

12. A jet propelled aircraft comprising an immovable housing for a jet-type engine, at least three individual thrust pipes communicating with said housing and terminating in pipe ends spaced from said housing, said pipes depending from said housing when the aircraft is on the ground and providing support for the aircraft on the ground, a pilot supporting station and a pilot operable control column in the area between said housing and said pipe ends, a movable valve mounted in each pipe for varying the flow quantity of gases therethrough for effecting directional control of the aircraft in flight, means operatively connecting each of said valves to said control column whereby independent adjustment of said valves may be effected, and adjustable flaps mounted adjacent said pipe ends in the path of the gases emanating from the pipes for controlling stability of the aircraft in flight.

13. A jet propelled aircraft capable of vertical take off and landing, comprising a plurality of individual jet engine thrust pipes extending substantially in an upright direction when the aircraft is at rest on the ground whereby said pipes have upper and lower ends, the pipe lower ends being spaced from each other and being cooperable for supporting the aircraft on the ground, the upper ends of said pipes being connected immovably to an engine housing whereby thrust gases produced in an engine in said housing flow through said pipes to effect propulsion of the aircraft, an airfoil wing extending from each of opposite sides of said aircraft and being fixedly and immovably mounted relative to said pipes for stabilizing flight of the aircraft, valve means mounted in each of said pipes to vary the flow of gases therefrom for effecting directional control of said aircraft in flight, and pilot operable means for selectively controlling said valve means.

14. A jet propelled aircraft capable of vertical take off and landing, comprising means mounted in a housing for producing a flow of thrust gases, a plurality of individual thrust pipes connected to said housing and extending therefrom with the ends of said pipes remote from said housing terminating at spaced points whereby gases produced by said means flow through said pipes to effect propulsion of the aircraft, an airfoil wing on each of opposite sides of said aircraft to stabilize flight thereof, valve means in each of said pipes to vary the flow of gases therethrough for effecting directional control of the aircraft in flight, pilot operable means for selectively controlling said valve means, and a pilot supporting station comprising a platform rigidly connected to each of said thrust pipes and bracing the same.

References Cited in the file of this patent

UNITED STATES PATENTS

| | | |
|---|---|---|
| 2,486,990 | Sharpe | Nov. 1, 1949 |
| 2,601,104 | Douglas | June 17, 1952 |
| 2,622,826 | Prince | Dec. 23, 1952 |
| 2,664,700 | Benoit | Jan. 5, 1954 |
| 2,668,026 | Price | Feb. 2, 1954 |
| 2,692,475 | Hull | Oct. 26, 1954 |
| 2,693,079 | Rau | Nov. 2, 1954 |
| 2,708,081 | Dobson | May 10, 1955 |
| 2,738,147 | Leech | Mar. 13, 1956 |
| 2,774,554 | Ashwood et al. | Dec. 18, 1956 |

FOREIGN PATENTS

| | | |
|---|---|---|
| 610,143 | Great Britain | Oct. 12, 1948 |
| 1,063,718 | France | Dec. 16, 1953 |